United States Patent
Qin et al.

(10) Patent No.: US 10,027,546 B1
(45) Date of Patent: Jul. 17, 2018

(54) METHOD AND SYSTEM FOR VIRTUAL STORAGE ARRAY MOBILITY AND LIVE MIGRATION USING LOCATOR-IDENTIFIER SEPARATION PROTOCOL

(71) Applicant: EMC IP Holding Company LLC, Hopkinton, MA (US)

(72) Inventors: Xiaohong Qin, Saratoga, CA (US); Kenneth Durazzo, San Ramon, CA (US); Suresh B. Kumar, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 272 days.

(21) Appl. No.: 14/584,236

(22) Filed: Dec. 29, 2014

(51) Int. Cl.
*G06F 15/167* (2006.01)
*H04L 12/24* (2006.01)
*H04L 29/08* (2006.01)

(52) U.S. Cl.
CPC ........ *H04L 41/082* (2013.01); *H04L 67/1097* (2013.01); *H04L 67/18* (2013.01)

(58) Field of Classification Search
CPC .... H04L 41/082; H04L 67/1097; H04L 67/18

USPC .......................................................... 709/214
See application file for complete search history.

(56) References Cited

U.S. PATENT DOCUMENTS

| | | | |
|---|---|---|---|
| 8,880,938 B2* | 11/2014 | Armstrong | G06F 11/07 714/4.12 |
| 9,276,871 B1* | 3/2016 | Freitas | H04L 61/2007 |
| 9,612,854 B2* | 4/2017 | Haddad | G06F 9/45533 |
| 2010/0198972 A1* | 8/2010 | Umbehocker | G06F 3/0604 709/226 |
| 2014/0301387 A1* | 10/2014 | Subramanian | H04L 45/02 370/389 |
| 2015/0063351 A1* | 3/2015 | Moreno | H04L 45/745 370/392 |

* cited by examiner

*Primary Examiner* — Sm Rahman
(74) *Attorney, Agent, or Firm* — Ryan, Mason & Lewis, LLP

(57) ABSTRACT

Example embodiments of the present invention relate to a method, a system, and a computer program product for implementing a locator-identifier separation protocol for a virtual storage array. The method includes associating an endpoint identifier to a virtual storage array in a datacenter and associating a routing locator with the endpoint identifier in accordance with a locator-identifier separation protocol. Communications with the virtual storage array then may be directed according to the endpoint identifier via its association with the routing locator.

21 Claims, 14 Drawing Sheets

DATA CENTER WITHOUT LISP

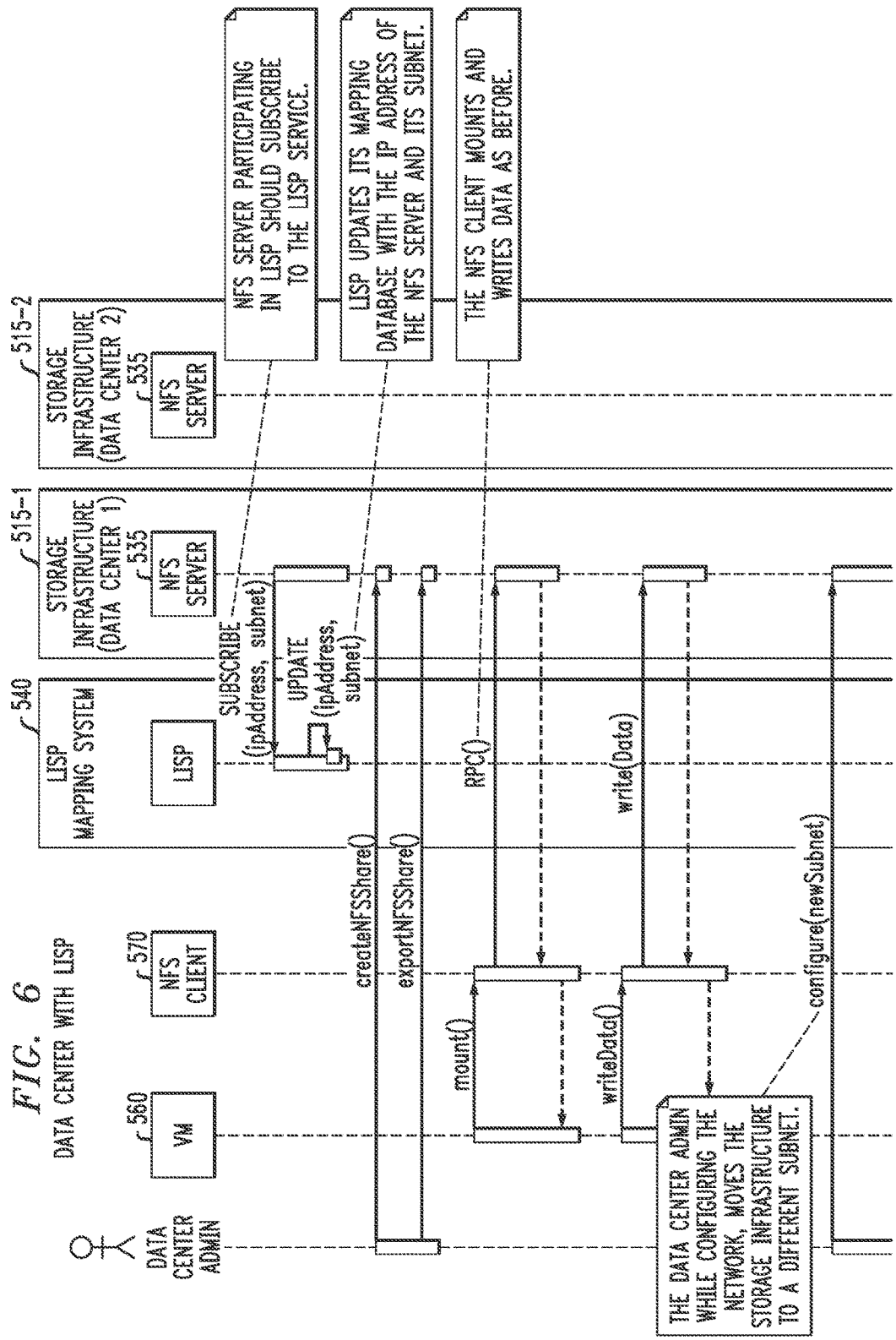

FIG. 7

| EID-RLOC MAPPING DATABASE |||||
|---|---|---|---|---|
| EID (IP ADDRESS OF NFS SERVER) | RLOC (SUBNET) | WEIGHT | TENANT-ID | PROFILE |
| 10.0.0.1 | 10.0.0.124 | 2 | 7789 | PLATINUM |
| 12.0.0.2 | 12.0.0.124 | 1 | 9870 | GOLD |

METHOD AND SYSTEM FOR VIRTUAL STORAGE ARRAY MOBILITY AND LIVE MIGRATION USING LOCATOR-IDENTIFIER SEPARATION PROTOCOL

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

This Application is related to U.S. patent application Ser. No. 14/578,582 entitled "STORAGE MOBILITY USING LOCATOR-IDENTIFIER SEPARATION PROTOCOL" filed on Dec. 22, 2014 the teachings of which applications are hereby incorporated herein by reference in their entirety.

TECHNICAL FIELD

The field relates generally to data centers and other types of information processing systems, and more particularly to techniques for implementing compute, storage and network resources in information processing systems.

BACKGROUND

A typical data center has a topology that is continually changing to accommodate expansion in compute, storage and network resources. Such changes can include upgrades or other reconfigurations of compute, storage and network resources, possibly involving movement of physical infrastructure components within a given data center or from one data center to another data center. Data center reconfigurations of this type can be particularly difficult under current practice, potentially leading to significant service disruptions. By way of example, a reconfiguration involving migration of storage resources within a data center or between data centers using existing techniques can require a data center administrator to schedule a service downtime, shut down all impacted resources, implement changes in network connections, test the network connections, and finally bring all the impacted resources back online. The downtime caused by such migration of storage resources can be highly disruptive to product and development environments.

SUMMARY

Example embodiments of the present invention relate to a method, a system, and a computer program product for implementing a locator-identifier separation protocol for a virtual storage array. The method includes associating an endpoint identifier to a virtual storage array in a datacenter and associating a routing locator with the endpoint identifier in accordance with a locator-identifier separation protocol. Communications with the virtual storage array then may be directed according to the endpoint identifier via its association with the routing locator.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 7 shows example entries in a mapping database of the FIG. 1 system;

DETAILED DESCRIPTION

Figure 1:
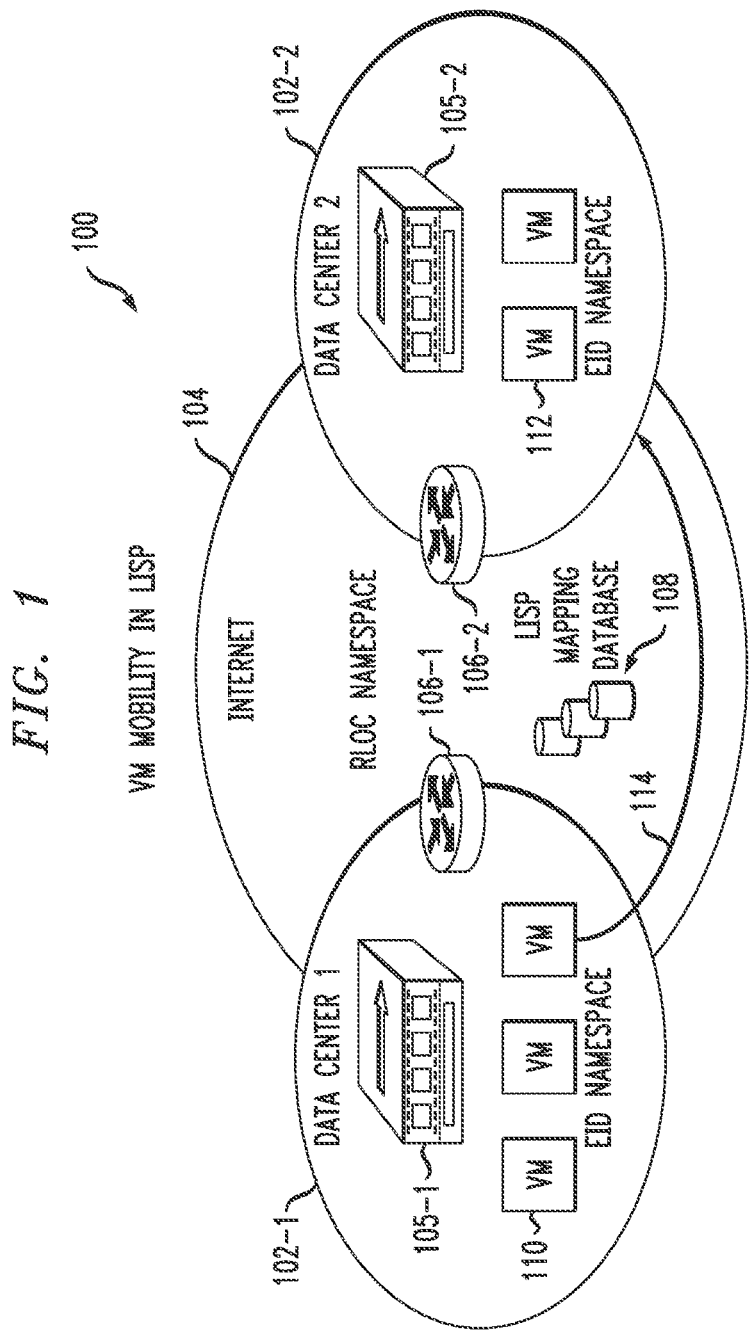
FIG. 1 is a block diagram of an information processing system implementing storage mobility utilizing a locator-identifier separation protocol in an illustrative embodiment of the invention.

FIG. 1 shows an information processing system 100 configured in accordance with an illustrative embodiment of the present invention. The information processing system 100 comprises first and second data centers 102-1 and 102-2, also referred to as Data Center 1 and Data Center 2. The first and second data centers 102-1 and 102-2 are configured to communicate over Internet 104. The first and second data centers 102-1 and 102-2 include respective processing platforms 105-1 and 105-2 and are coupled to the Internet 104 via respective routers 106-1 and 106-2. Associated with the Internet 104 is a LISP mapping database 108 comprising multiple storage devices as shown.

In these and other illustrative embodiments described herein, LISP is assumed without limitation to refer to the Locator/ID Separation Protocol described in D. Farinacci et al., Internet Engineering Task Force (IETF) Request for Comments (RFC) 6830, "The Locator/ID Separation Protocol (LISP)," January 2013, which is incorporated by reference herein. However, it is to be appreciated that other types of protocols involving separation of locator and identifier in network communications can be used. Such protocols are more generally referred to herein as locator-identifier separation protocols, and the LISP protocol described in RFC 6830 is considered an example of a locator-identifier separation protocol.

The information processing system 100 in the present embodiment utilizes the LISP mapping database 108 to control mapping between Endpoint Identifier (EID) namespaces associated with the respective data centers 102-1 and 102-2 and a Routing Locator (RLOC) namespace associated with Internet 104. The use of LISP in this context allows endpoint devices to move within the system 100 without changing their respective EIDs but instead changing only their respective RLOCs. The LISP mapping database 108 stores EID-RLOC mappings that collectively allow each of a plurality of endpoint devices having respective EIDs to be located at different RLOCs within the system.

By way of example, data center 102-1 in the FIG. 1 embodiment comprises a plurality of virtual machines (VMs) 110 that run on processing platform 105-1. Similarly, data center 102-2 comprises a plurality of VMs 112 that run on processing platform 105-2. Each of the VMs 110 and 112 has a corresponding EID within its EID namespace associated with data center 102-1 or data center 102-2. The use of LISP allows the VMs 110 and 112 to migrate between the data centers 102. For example, a given one of the VMs 110 of the first data center 102-1 can migrate to the second data center 102-2 in the direction of the arrow 114. In conjunction with the migration, a corresponding update is made to the appropriate EID-RLOC mapping stored by the LISP mapping database 108.

Although migration of a virtual machine is illustrated in the FIG. 1 embodiment, migration need not exclusively involve virtual machines. For example, other migration scenarios can involve migration of alternative compute instances, which could illustratively comprise so-called "bare metal" elements of the system.

The EIDs and RLOCs are in the form of standard IP addresses. Routers such as routers 106-1 and 106-2 that are arranged between an EID namespace and an RLOC namespace serve as ingress or egress tunnel routers, depending upon the direction of communication. As a given packet traverses an EID namespace, its destination address is an EID, and as the packet traverses an RLOC namespace, its destination address is an RLOC. An ingress tunnel router prepends an LISP header on a given packet received from an EID namespace. The LISP header includes the destination RLOC as determined by the ingress tunnel router from an EID-RLOC mapping in the LISP mapping database 108. The RLOC identifies an egress tunnel router, which strips the LISP header from the packet such that it can be delivered to the destination EID. Accordingly, LISP routers intercept EID-addressed packets and assist in delivering them across the network core where EIDs cannot be routed.

Some embodiments of the invention utilize LISP to facilitate storage mobility within an information processing system such as system 100 comprising data centers 102-1 and 102-2 as previously described.

Figure 2:
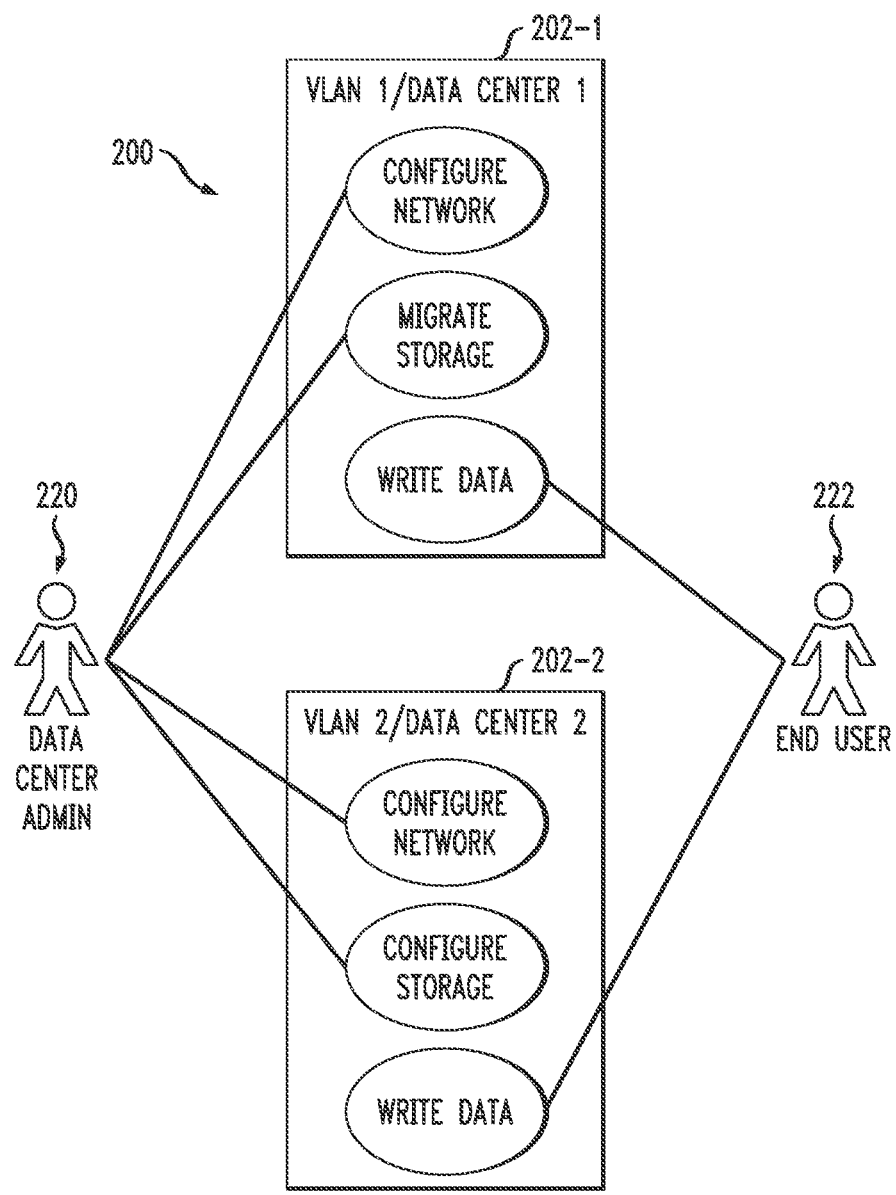
FIG. 2 illustrates an example of a storage migration scenario in an illustrative embodiment.

An example of a storage migration scenario involving an information processing system of this type is shown in FIG. 2. In this embodiment, an information processing system 200 comprises first and second data centers 202-1 and 202-2 that are assumed to be associated with respective distinct virtual local area networks (VLANs) denoted as VLAN 1 and VLAN 2. The system 200 is otherwise configured in a manner substantially the same as that described previously for system 100 of FIG. 1. It is further assumed that the first and second data centers 202-1 and 202-2 are administered by a data center administrator 220. An end user 222 performs write data operations involving at least one storage device of the first data center 202-1. This storage device is to be migrated from the first data center 202-1 to the second data center 202-2. In conjunction with the migration, the data center administrator 220 performs configure network and migrate storage operations in the first data center 202-1 as well as configure network and configure storage operations in the second data center 202-2. These operations performed by the data center administrator 220 complete the migration of the storage device. As a result, the end user 222 can now perform write data operations involving the migrated storage device in the second data center 202-2.

The term "end user" in this context is intended to be broadly construed so as to encompass, for example, human, hardware, software or firmware entities, as well as various combinations of such entities.

Although the example migration in the FIG. 2 embodiment is from a first data center to a second data center, other types of migrations can be addressed in other embodiments, including migration within a given data center. For example, a storage server can be migrated between racks or between rows within a single data center comprising multiple racks of storage equipment arranged in multiple rows. Such a migration within a given data center illustratively maps to movement of at least one virtual machine or movement of at least one compute instance within that data center. Numerous other types of reconfigurations are contemplated.

As mentioned previously, data center reconfigurations involving storage migration can be problematic under current practice, possibly leading to substantial amounts of downtime and associated service disruptions. These drawbacks of conventional arrangements are alleviated in some embodiments through utilization of LISP to facilitate storage mobility within an information processing system such as system 100 or 200. Such facilitation of storage mobility will now be described in greater detail with reference to FIGS. 3 through 6.

Figure 3:
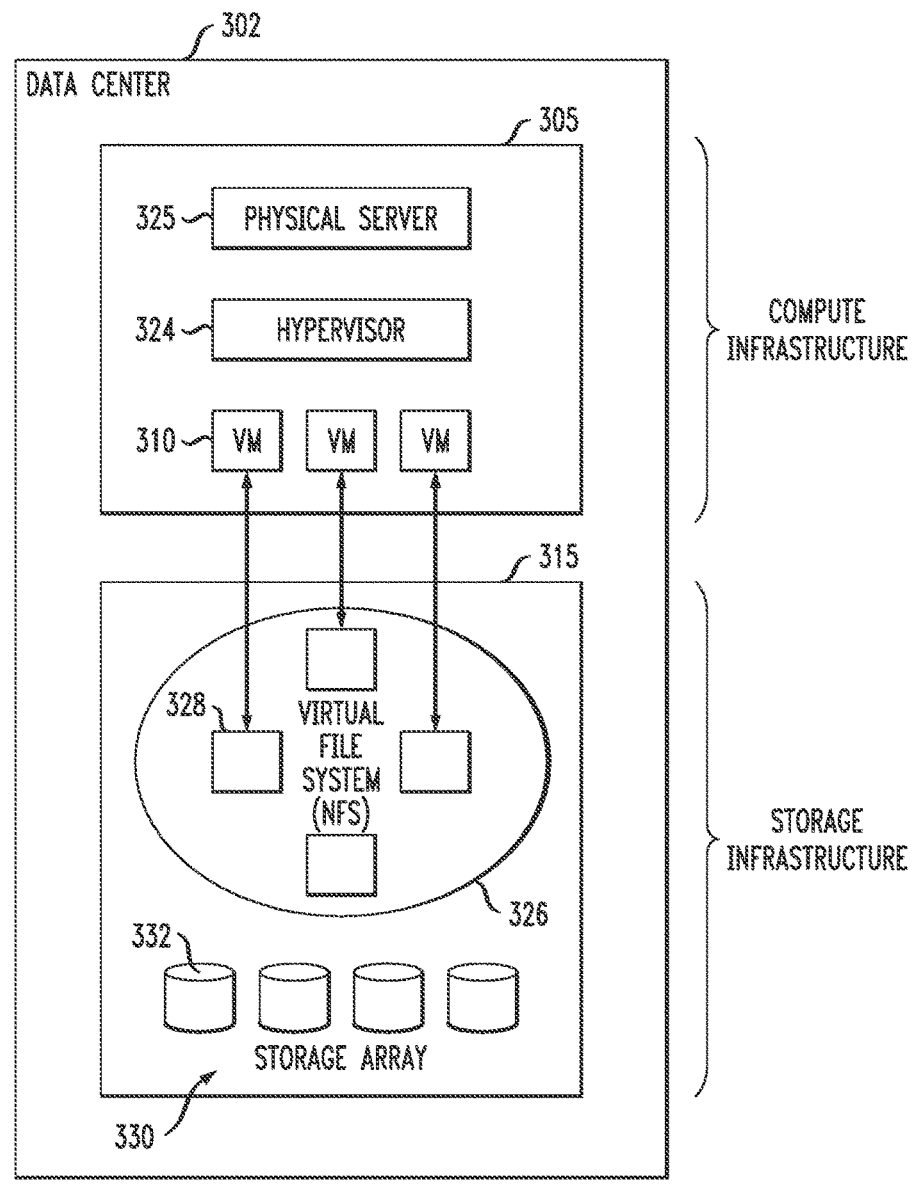
FIG. 3 shows a data center embodiment that is not configured to utilize a locator-identifier separation protocol for storage mobility.

Referring initially to FIG. 3, a data center 302 comprises compute infrastructure 305 including hypervisor 324, physical server 325 and VMs 310 each running a different operating system but sharing a single hardware platform. The VMs 310 interact with storage infrastructure 315. The storage infrastructure 315 comprises a virtual file system 326 that allows the VMs 310 to access multiple file systems as if each of those file systems were locally attached. The storage infrastructure 315 further comprises a storage array 330 comprising multiple storage devices 332.

In the FIG. 3 embodiment, it is assumed for purposes of illustration that the data center 302 is not configured to utilize a locator-identifier separation protocol such as LISP for storage mobility.

The virtual file system 326 in this embodiment is assumed to be based on a Network File System (NFS) protocol and comprises multiple NFS servers 328. NFS is a client-server protocol which offers virtual file system capabilities and hides the location of the files on the network. Also, NFS-mounted file systems contain no information about the file server from which they are mounted. It is to be appreciated, however, that other types of file systems can be used in other embodiments. For example, additional or alternative file systems such as Hadoop Distributed File System (HDFS), General Parallel File System (GPFS), Lustre, PanFS and numerous others can be used in other embodiments, as well as various combinations of two or more of these or other file systems.

In the data center 302, the VMs 310 of the compute infrastructure 305 act as respective NFS clients and interact with the NFS servers 328 of the virtual file system 326. Although not shown as separate elements in the figure, the NFS clients can illustratively be implemented as elements coupled to or otherwise associated with the VMs, as in the embodiment to be described below in conjunction with FIG. 5. The NFS servers 328 illustratively run on one or more appliances or other processing devices coupled to or otherwise associated with the storage array 330. Additionally or alternatively, in some embodiments one or more of the NFS servers 328 can be configured to run directly on the storage array 330.

The NFS servers 328 are examples of what are more generally referred to herein as "storage servers" and the NFS clients associated with respective ones of the VMs 310 are examples of what are more generally referred to herein as "storage clients." Other types and arrangements of storage clients and storage servers can be used in other embodiments. For example, in some embodiments, additional or alternative storage types can be used, such that storage servers and storage clients as those terms are broadly used herein can be extended to operate using one or more of block, object, file and multimedia storage types, as well as other storage types or combinations thereof. Also, in some embodiments, storage clients can be associated with respective compute instances or other types of system elements, in place of or in addition to being associated with respective virtual machines.

It is also be appreciated in this regard that the term "endpoint" as used herein is intended to be broadly construed, and may illustratively comprise a virtual machine, a compute instance or other system element suitable for identification using an endpoint identifier that can be associated with a locator.

The storage array 330 illustratively comprises storage products such as VNX® and Symmetrix VMAX®, both commercially available from EMC Corporation of Hopkinton, Mass. Other types of storage products can be used in implementing storage array 330 or portions thereof, including scale-out network attached storage (NAS) clusters implemented, for example, using Isilon® storage platforms, such as storage platforms comprising Isilon® platform nodes and associated accelerators in the S-Series, X-Series and NL-Series product lines, also commercially available from EMC Corporation. A wide variety of other storage products can be used to implement at least portions of the storage array 330 and its associated NFS servers 328 of virtual file system 326.

An NFS client associated with one of the VMs 310 makes remote procedure calls (RPCs) to one or more of the NFS servers 328 in order to read and write data stored in the storage devices 332 of the storage array 330. A given NFS server creates an NFS share in order to allow its NFS clients to access corresponding data in the storage array 330. A given NFS client associated with one of the VMs 310 mounts this NFS share in order to allow the VM to access the corresponding data via the NFS client and NFS server. The syntax for mounting the NFS share in some embodiments is of the form:

mount <nfs server ip address>:/nfs/server/folder /nfs/client/folder.

It is apparent from the foregoing syntax that mounting of the NFS share utilizes the current IP address of the NFS server. Accordingly, a storage migration of the type previously described in conjunction with FIG. 2 can present considerable difficulties in the context of the exemplary data center 302, in that such a migration involving one of the NFS servers 328 will typically require a change in IP address of the NFS server, such that each of the NFS clients is required to remount the NFS share after the storage migration is complete. Additionally or alternatively, the migration may require a change in a domain name service (DNS) server entry corresponding to the migrated NFS server. As mentioned previously, the NFS clients in this embodiment correspond to respective ones of the VMs 310, and a given data center such as data center 302 can include hundreds or thousands of such virtual machines.

Figure 4:
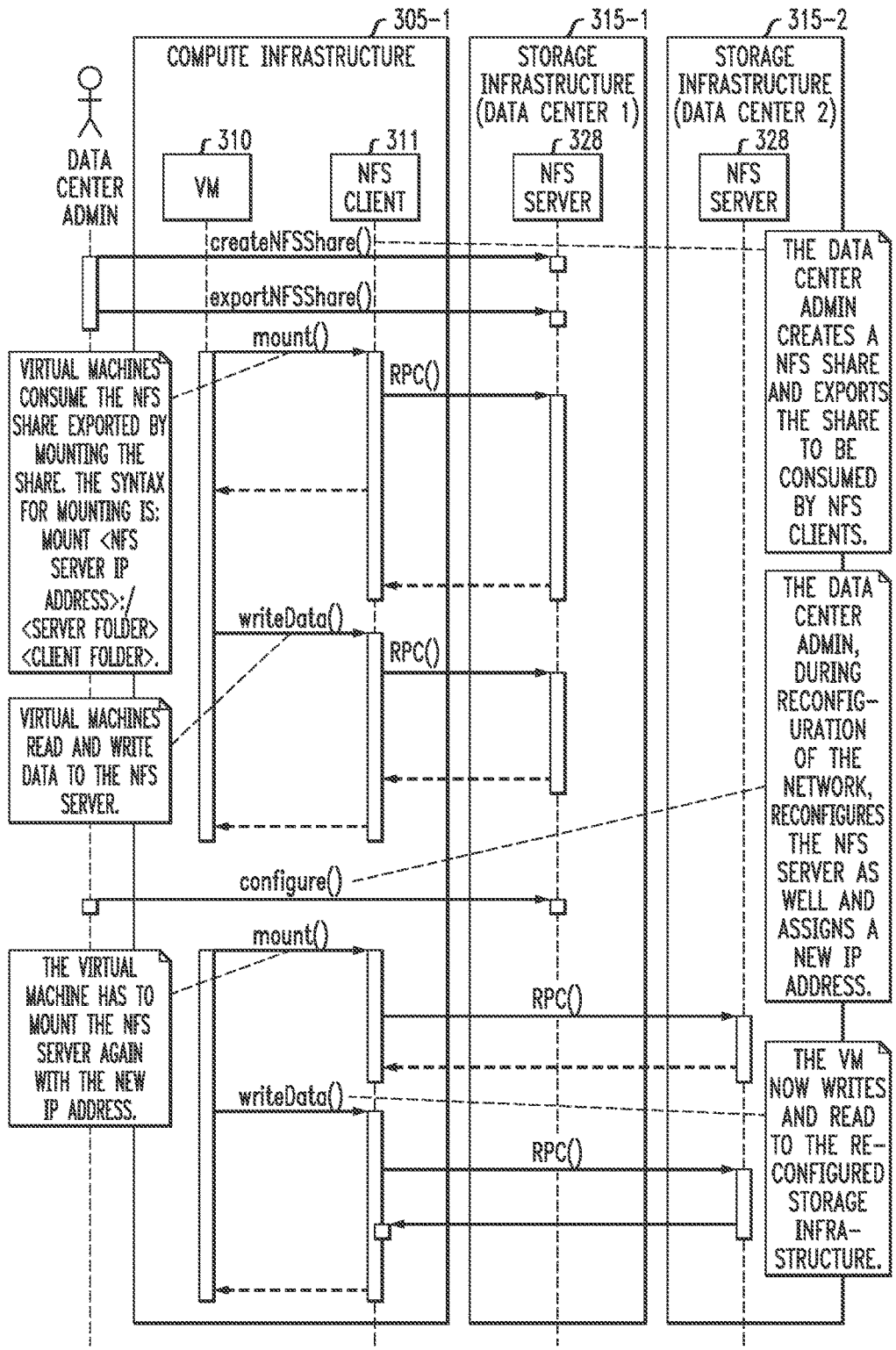
FIG. 4 illustrates a storage migration process involving multiple data centers configured as shown in FIG. 3.

FIG. 4 illustrates a storage migration process involving multiple data centers each configured like the data center 302 of FIG. 3. More particularly, the process of FIG. 4 involves a particular one of the VMs 310 and its associated NFS client 311, both implemented in compute infrastructure 305-1 of a first data center denoted Data Center 1. The diagram in FIG. 4 shows the sequence of events associated with the VM 310 attempting to access a file on an NFS server 328 via the NFS client 311.

Initially, a data center administrator creates an NFS share and exports the share to be consumed by NFS clients and their associated VMs. As noted above, VM 310 is associated with NFS client 311. The VM 310 consumes the exported NFS share by mounting the share, via its associated NFS client 311, using the previously-described syntax of the form mount <nfs server ip address>:/nfs/server/folder /nfs/client/folder, illustratively shown in the figure using the alternative form mount <nfs server ip address>:/<server folder><client folder>. After mounting the NFS share, the VM 310 can read and write data via the NFS client 311 and the NFS server 328.

The storage migration in the FIG. 4 process involves moving at least a portion of the storage infrastructure 315-1 of Data Center 1 to a second data center denoted Data Center 2. As a result of this migration, the NFS server 328 of the storage infrastructure 315-1 of Data Center 1 is moved to storage infrastructure 315-2 of Data Center 2. In conjunction with the storage migration, the data center administrator performs a network reconfiguration which includes reconfiguring the NFS server 328 and assigning that server a new IP address. The VM 310 therefore has to remount the NFS share, using the new IP address of the NFS server 328. The VM 310 can then once again read and write data via the NFS client 311 and the NFS server 328. As mentioned above, such required remounting of NFS shares in conjunction with storage migration is undesirable, particularly in data centers that include hundreds or thousands of virtual machines.

This remounting problem is advantageously avoided in embodiments in which the data centers are illustratively configured to utilize LISP or another locator-identifier separation protocol in conjunction with storage migration.

Figure 5:
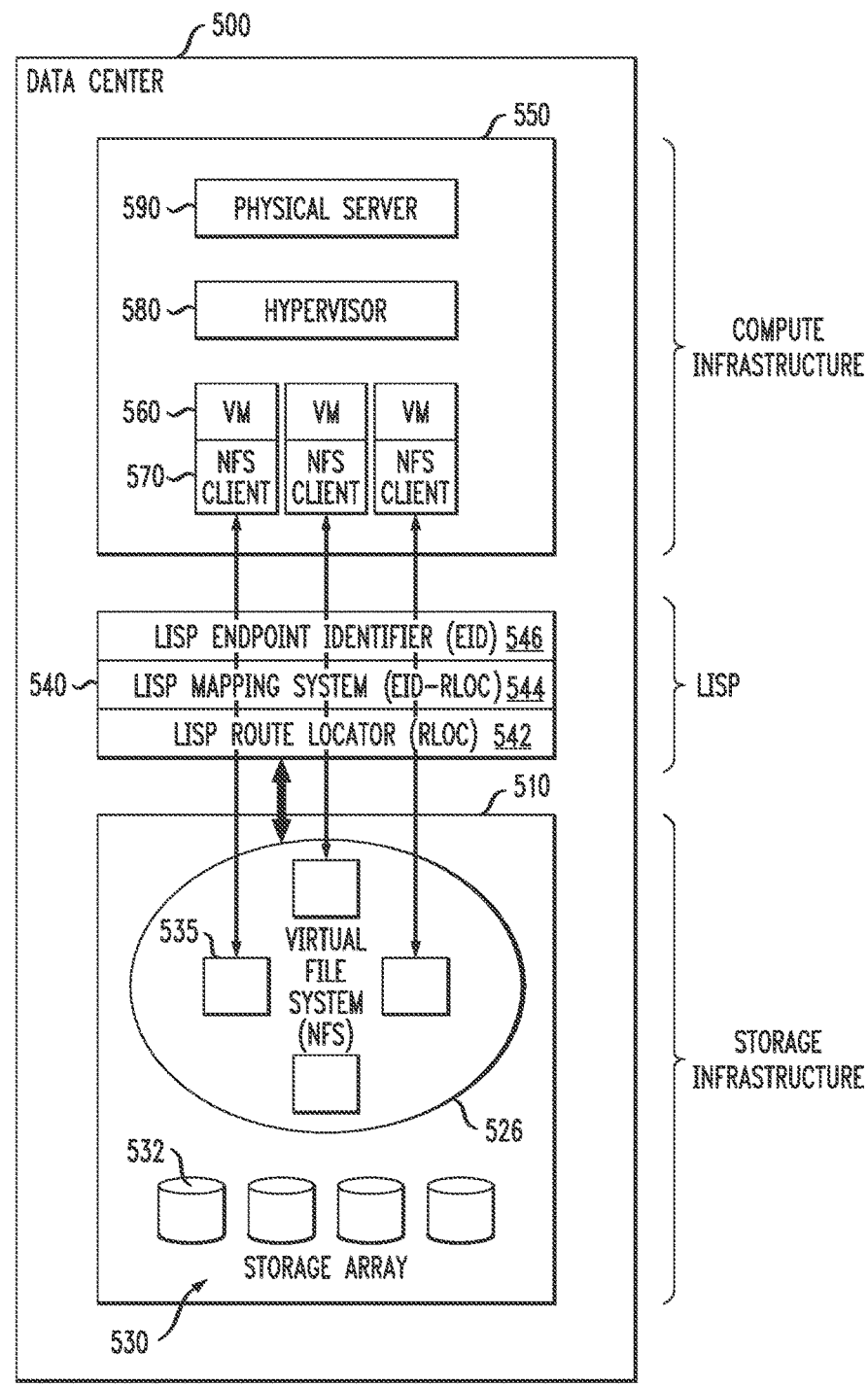
FIG. 5 shows a data center embodiment that is configured to utilize a locator-identifier separation protocol for storage mobility.

Referring now to FIG. 5, a data center 500 comprises compute infrastructure 550 including hypervisor 580, physical server 590 and VMs 560 each running a different operating system but sharing a single hardware platform. Each of the VMs 560 has an associated NFS client 570. The VMs 560 interact with storage infrastructure 510. The storage infrastructure 510 comprises a virtual file system 526 that allows the VMs 560 to access multiple file systems as if each of those file systems were locally attached. The storage infrastructure 510 further comprises a storage array 530 comprising multiple storage devices 532.

In the FIG. 5 embodiment, it is assumed for purposes of illustration that the data center 500 is configured to utilize a locator-identifier separation protocol such as LISP for storage mobility. As will be described, this embodiment avoids the need to remount NFS shares upon migration or other types of reconfiguration of data center storage infrastructure comprising one or more NFS servers.

The virtual file system 526 in this embodiment is assumed to be based on an NFS protocol and comprises multiple NFS servers 535. Again, other types of file systems can be used in other embodiments.

In the data center 500, the VMs 560 of the compute infrastructure 550 are associated with respective clients 570 that interact with the NFS servers 535 of the virtual file system 526 via a LISP mapping system 540. The NFS servers 535 illustratively run on one or more appliances or other processing devices coupled to or otherwise associated with the storage array 530. Additionally or alternatively, in some embodiments one or more of the NFS servers 535 can be configured to run directly on the storage array 530.

An NFS client associated with one of the VMs 560 makes RPCs to one or more of the NFS servers 535 in order to read and write data stored in the storage devices 532 of the storage array 530. A given NFS server creates an NFS share in order to allow its NFS clients to access corresponding data in the storage array 530. A given NFS client associated with one of the VMs 560 mounts this NFS share in order to access the corresponding data, using the NFS share mounting syntax as previously described.

The LISP mapping system 540 is arranged between the NFS clients 570 and the NFS servers 535 of the virtual file system 526. The LISP mapping system 540 in this embodiment performs EID-RLOC mapping using a mapping database such as LISP mapping database 108 of FIG. 1. More particularly, the LISP mapping system 540 mediates between LISP EIDs 546 from an EID namespace and RLOCs 542 of an RLOC namespace. This illustratively involves mapping EIDs to RLOCs 544 in order to support communication between NFS clients in one data center and NFS servers in another data center.

It should be recognized that the LISP mapping system 540 within a given data center such as data center 500 may comprise a portion of a larger system that is shared among multiple data centers. For example, such a system illustratively comprises a LISP mapping database and one or more associated network devices that are part of the Internet or another network supporting communication between the multiple data centers.

The LISP mapping system 540 in some embodiments is part of a LISP processor implemented on one or more routers. For example, the LISP mapping system 540 illustratively comprises at least a portion of one or more routers such as routers 106-1 and 106-2 in the FIG. 1 embodiment, operating as ingress or egress tunnel routers separating an RLOC namespace from one or more EID namespaces. The associated LISP mapping database 108 may be part of the LISP mapping system 540 or implemented at least in part as a separate system component. Numerous other arrangements of one or more network devices or more generally processing devices may be used to implement the LISP mapping system 540.

Figure 6:
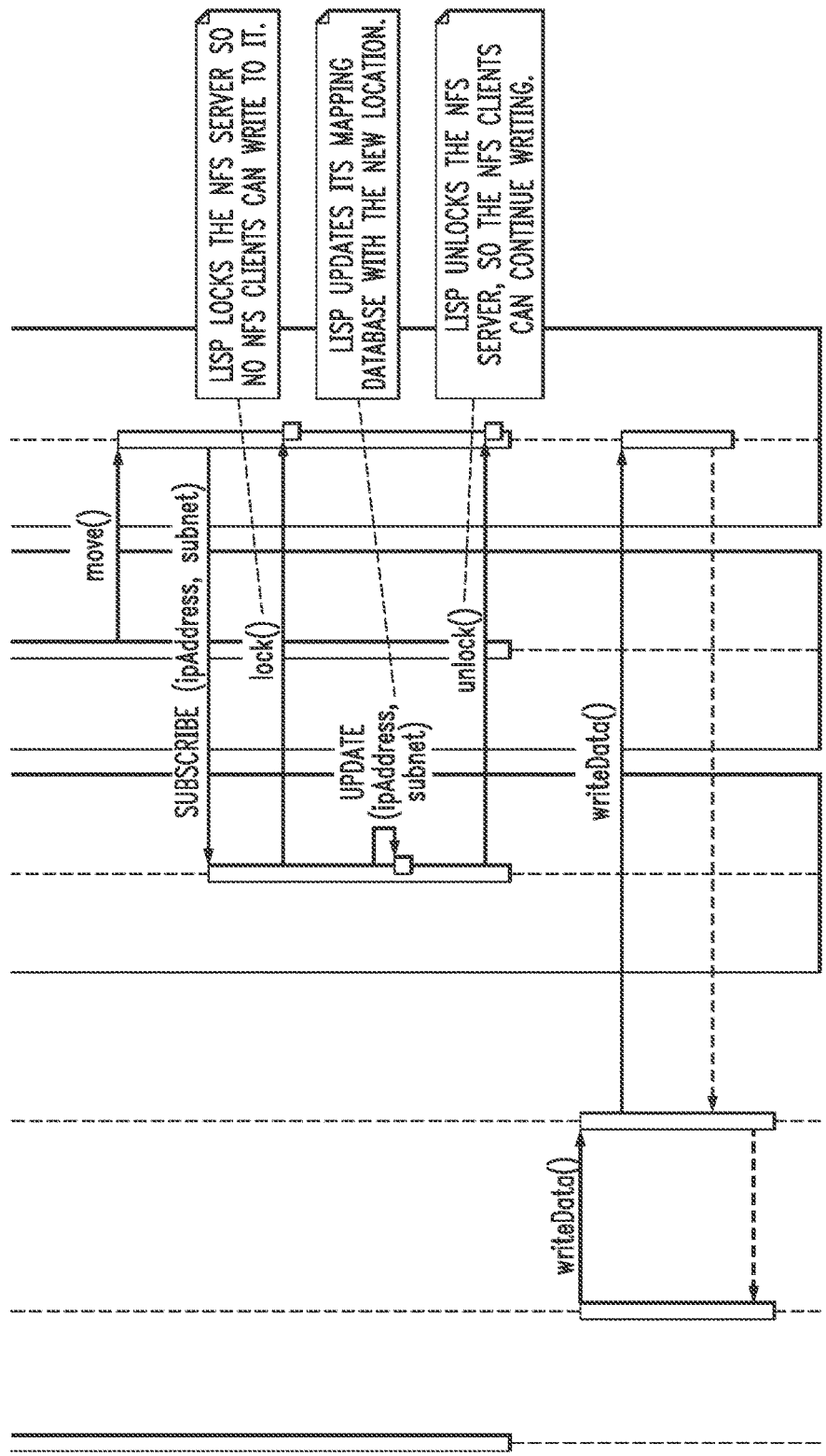
FIG. 6 illustrates a storage migration process involving multiple data centers configured as shown in FIG. 5.

FIG. 6 illustrates a storage migration process involving multiple data centers each configured like the data center 500 of FIG. 5. More particularly, the process of FIG. 6 involves a particular one of the VMs 560 and its associated NFS client 570, both implemented in compute infrastructure 550 of a first data center denoted Data Center 1. The diagram in FIG. 6 shows the sequence of events associated with the VM 560 attempting to access a file on an NFS server 535 via the NFS client 570.

Initially, the NFS server 535 participates in LISP functionality by subscribing to the LISP service provided by the LISP mapping system 540. The LISP mapping system 540 then updates the mapping database with the IP address of the NFS server 535 and its subnet. A data center administrator creates an NFS share and exports the share to be consumed by NFS clients and their associated VMs. As noted above, VM 560 is associated with NFS client 570. The VM 560 consumes the exported NFS share by mounting the share, via its NFS client 570, using the previously-described syntax of the form mount <nfs server ip address>:/nfs/server/folder /nfs/client/folder. After mounting the NFS share, the VM 560 can read and write data via the NFS client 570 and the NFS server 535.

The storage migration in the FIG. 6 process involves moving at least a portion of the storage infrastructure 515-1 of Data Center 1 to a second data center denoted Data Center 2. As a result of this migration, the NFS server 535 of the storage infrastructure 515-1 of Data Center 1 is moved to storage infrastructure 515-2 of Data Center 2.

In conjunction with the storage migration, the data center administrator performs a network reconfiguration which includes moving the NFS server 535 to a new subnet. However, a new IP address is not assigned to the NFS server 535. During the migration, the LISP mapping system 540 locks the NFS server 535 for any writes by the NFS clients thereby guaranteeing atomicity for all transactions between the NFS clients and the NFS server 535. The NFS server, after the migration, will subscribe to the LISP service again, so the LISP mapping system 540 can update its mapping database with the new subnet location. After updating its mapping database, the LISP mapping system 540 unlocks the NFS server 535 so the NFS clients can continue reading and writing data via the NFS server 535 as before.

Accordingly, in the embodiments described in conjunction with FIGS. 5 and 6, the VM 560 does not have to remount the NFS share, as the IP address of the NFS server 535 remains unchanged despite the storage migration. The VM 560 can therefore continue to read and write data via NFS client 570 and NFS server 535 without the need to remount the NFS share each time the storage infrastructure is migrated or otherwise reconfigured. This provides a significant advantage over conventional storage migration techniques, particularly in data centers that include hundreds or thousands of virtual machines. For example, downtime associated with storage migration or other reconfigurations of storage infrastructure is considerably reduced, leading to improved continuity of service within the system.

In the embodiments of FIGS. 5 and 6, the LISP mapping system 540 provides a level of indirection between the NFS clients 570 and the NFS servers 535. The NFS servers 535 first participate in LISP by subscribing to the LISP service. The LISP mapping system 540 utilizes EID-RLOC mapping entries to persist mappings between the IP addresses of the NFS servers and the subnets of those storage servers. This not only allows the NFS server identity as expressed in its EID to be separated from its location but also allows routing to be performed based on local subnet instances persisted in the mapping database.

Storage servers such as NFS servers 535 or other types of storage infrastructure subject to migration or other types of reconfiguration in a given embodiment can include both single-homed and multi-homed devices, in any combinations. The disclosed techniques advantageously provide enhanced flexibility in storage mobility and reconfiguration in both single-homed and multi-homed environments.

FIG. 7 illustrates example entries in an EID-RLOC mapping database utilized by the LISP mapping system 540 in the embodiments of FIGS. 5 and 6. The mapping database in this embodiment comprises a plurality of EID-RLOC mapping entries. The EID-RLOC mapping entries more particularly comprise respective EIDs in the form of IP addresses of respective ones of the NFS servers 535, and RLOCs denoting subnets associated with the corresponding EIDs. The EID-RLOC mapping entries include not only EIDs and RLOCs that are used to facilitate storage mobility as previously described in conjunction with FIGS. 5 and 6, but also additional information that supports additional functionality for policy configuration and management of storage traffic.

For example, assume that the data centers comprise one or more clouds hosting multiple tenants that share cloud resources. A given tenant could be an organization or a group of users within an organization. In many cases, a tenant would like to have its own dedicated portion of the storage infrastructure of the cloud for performance or security reasons. The LISP mapping system 540 in such an arrangement allows a given tenant to be isolated and have its own dedicated NFS server or NFS servers, such that performance and security goals of the tenant can be more readily achieved. In the FIG. 7 mapping database, EID-RLOC mapping entries are additionally associated with particular tenant identifiers ("tenant-id") as shown, such that one or more NFS servers can be assigned to individual tenants.

Additionally or alternatively, different levels of Quality of Service (QoS) can be provided to tenants. For example, a tenant in the cloud can be classified based on the service offered to the tenant, such as services in a hierarchy of levels illustratively including "platinum," "gold" and "silver" levels. As shown in FIG. 7, the EID-RLOC entry for tenant-id 7789 indicates a platinum level and the EID-RLOC entry for tenant-id 9870 indicates a gold level. These different service levels have different weights for storage service, with the platinum level having a weight of 2 and the gold level having a weight of 1. The LISP mapping system 540 is configured to enforce the weightings associated with the different service levels as identified in the additional information in the EID-RLOC entries.

Numerous other policies can be specified and enforced for different cloud tenants in this manner, including access control and other types of security policies. More generally, EID-RLOC entries can be supplemented with tenant profile information that allows implementation of policies relating to QoS, security or other factors.

Virtual Storage Array Mobility and Live Migration Using LISP

The predominant IP address infrastructure and deployment has an inherent limitation: the IP address associated to a physical Network Interface Card (NIC) is not permanent or sticky. In other words, the IP address assigned to a NIC typically is dynamic and may be changed from time to time. This paradigm works very well in the IP network filled up with physical network devices, hosts, and endpoints. However due to the wide acceptance of virtualization technologies, services hosted on virtual machines (VMs) frequently may be moved around and are expected to execute the tasks during the movement. This poses a great challenge to many old physical oriented network technologies and protocols, including dynamic IP addresses assignment. While using DNS or DHCP may mitigate or solve the IP address renumbering problem, static IP addresses are used in a typical data center deployment simply because data center infrastructure is part of the DNS/DHCP service deployment that has to use static IP addresses initially.

Example embodiments of the present invention use LISP network technology to solve this problem and make services hosted on virtual entities more flexible and powerful. As understood in the art and as described above, LISP creates a level of indirection to the Internet routing and addressing architecture by creating two namespaces: (1) EIDs; and (2) RLOCs. The main advantage of this approach is to provide Internet Protocol (IP) mobility (i.e., EIDs can move without changing any of their identification properties; rather, only the RLOC changes). Also, RLOCs can be aggregated thereby improving the scalability of the routing system. LISP achieves this mobility by introducing a mapping mechanism between the two namespaces such that EIDs may be found at different RLOCs based on the EID-RLOC mappings. Further, EIDs may be assigned to VMs and may change locations and are free to migrate between data centers, with only the mapping between the EIDs and RLOCs being updated in case of such migration.

Figure 8:
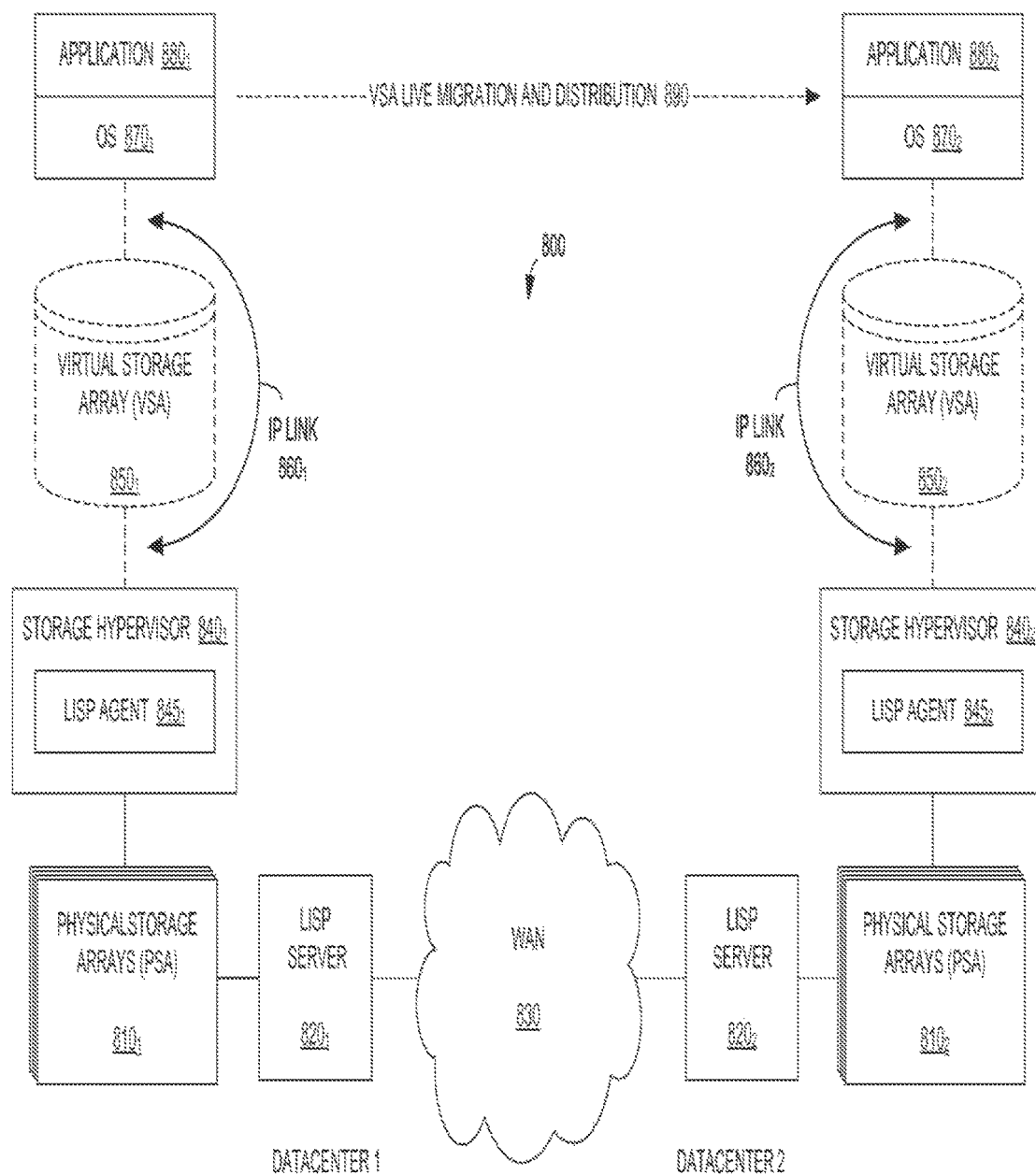
FIG. 8 is a block diagram of a system according to an example embodiment of the present invention.

FIG. 8 is a block diagram of a system 800 according to an example embodiment of the present invention. As illustrated in FIG. 8, a first datacenter and a second datacenter may be connected via a WAN 830. Each datacenter may include a plurality of physical storage arrays (PSA) 810$_1$, 810$_2$ (810 generally), a LISP server 820$_1$, 820$_2$ (820 generally), and a storage hypervisor 840$_1$, 840$_2$ (840 generally) running a LISP agent 845$_1$, 845$_2$ (845 generally). In certain embodiments, the LISP agent may run on a network switch (not shown) in the datacenter. The storage hypervisors 840 may present a virtual storage array (VSA) 850$_1$, 850$_2$ (850 generally) on which an operating system (OS) 870$_1$, 870$_2$ (870 generally) and one or more applications 880$_1$, 880$_2$ (880 generally) may be installed. The storage hypervisors 840 and the operating systems/applications 870, 880 may be communicatively coupled via an IP link 860$_1$, 860$_2$ (860 generally). As will be described in greater detail below, migration (or load balancing/distribution) 890 may be performed for the VSAs 850 from the first data center to the second data center.

As illustrated in FIG. 8, a VSA 850 may be attached to or affiliated with a certain type of PSA which typically consist of storage media, data bus mover, computer server, etc. A VSA may be created by a storage hypervisor 840 that is normally hosted on a PSA 810. If, under certain circumstances (e.g., live migration, disaster recovery, and load balance distribution), a VSA 850 may be required to move from one PSA 810 to another (e.g., from PSA 810$_1$ in data center 1 to PSA 810$_2$ in datacenter 2), the IP addresses configured inside the VSA would need to be renumbered due to IP address infrastructure limitation. This IP address renumbering requirement can pose serious consequences to VSA 850 deployment and usage as it may affect high availability and data consistency, which are critical to data center storage arrays.

Figure 11:
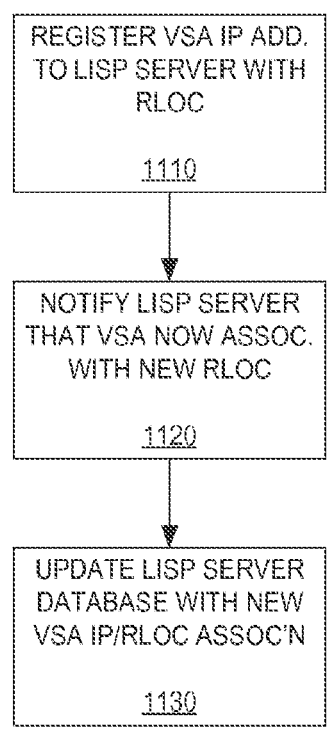
FIG. 11 is a flow diagram illustrating a method according to an example embodiment of the present invention.

As illustrated in FIG. 8, LISP enables the creation permanent IP addresses for the VSA 850, VM, and other virtual entities, including OSes 870 and applications 880 so the VSAs 850 may be moved across the WAN 830 (e.g., Internet) without changing IP addresses. In other words, as illustrated in FIGS. 8 and 11, the original IP addresses are registered to LISP servers 820$_1$, 820$_2$ (1110) with its association of subnet or locator. When the migration starts, LISP agent 845$_1$ notifies (1120) the LISP server 820$_1$ that this particular VSA 850$_1$ with this locator is being relocated to another place (e.g., to datacenter 2 in its VSA 850$_2$). The existing link 860$_1$ is, therefore, no longer available and, after the migration to datacenter 2 and the new link 860$_2$ has been established, the new locator will be updated to the LISP server 820$_2$ through the LISP agent 845$_2$ running in the hypervisor 840$_2$ providing the target VSA 850$_2$ (1130).

It should be understood that, in certain embodiments, using LISP to keep IP address on virtual endpoints persistent can provide robust services using IP address such as NFS, database, etc. While LISP is completely orthogonal to application or endpoints, it can be independently deployed on network infrastructures without affecting any endpoints or application software. Further, LISP agents may be deployed to function inside hypervisors in cases that LISP is not configured on physical network device yet. Therefore, the LISP tunnel may be terminated on the hypervisor and connected to the LISP map resolver/services directly.

Therefore, with LISP, VSA connections 860 to the IP network are completely separated from the underlying physical entities, such as network devices, PSA 810, computer server, etc. Each VSA 850 may get an IP link 860 from a cluster independently and keep the IP address, for example, permanently. Load balancing distribution, failover, disaster recovery, and other internal cluster adjustments may be made at any time within the cluster with no need to expose these events or activities to VSA 850. Therefore, for example, a VSA 850 may be communicatively coupled with a PSA 810 in New York at a first time and might be migrated to a PSA 810 in San Francisco at a second time.

Figure 9:
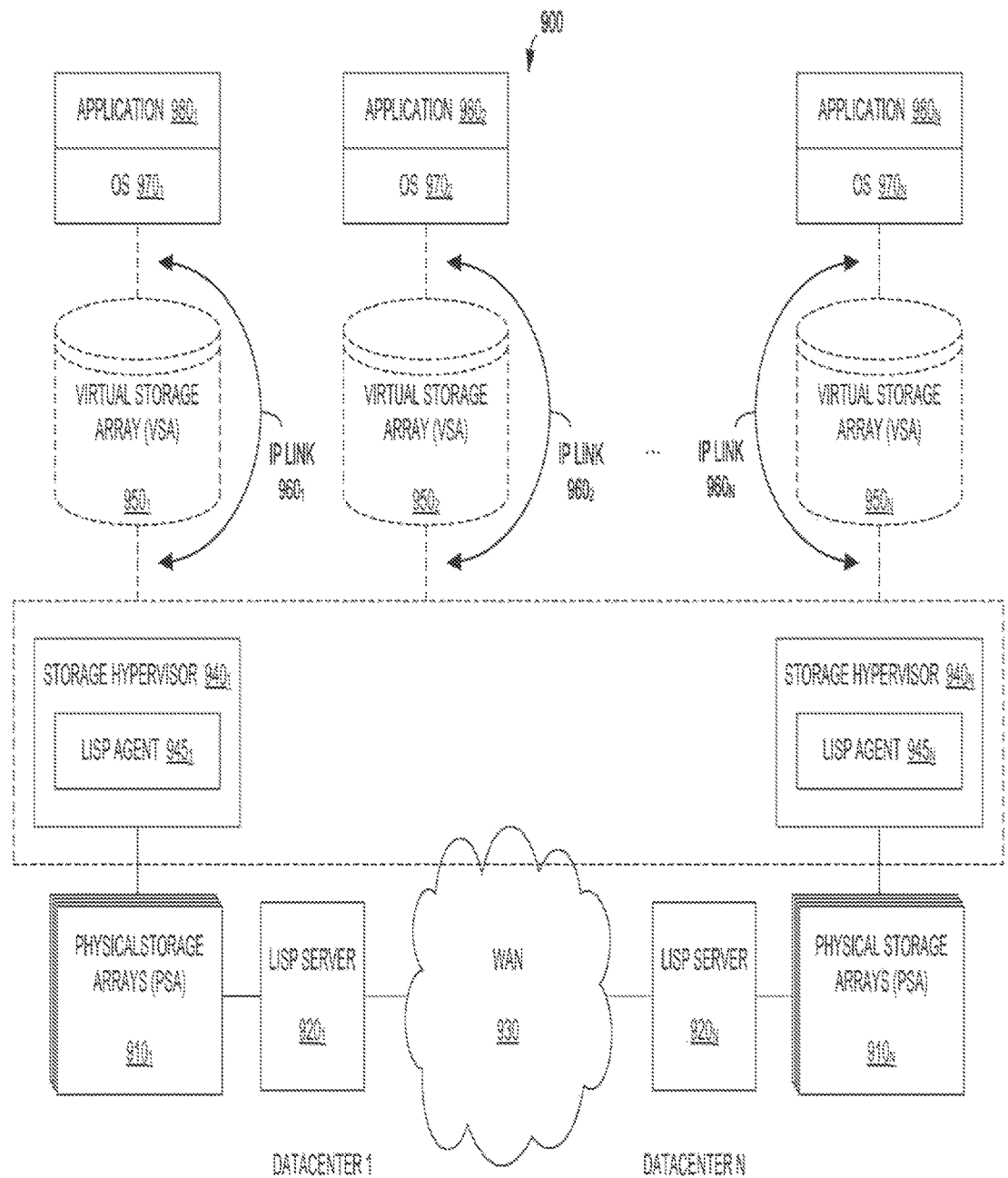
FIG. 9 is a block diagram of a system according to an example embodiment of the present invention.

FIG. 9 is a block diagram of a system 900 according to an example embodiment of the present invention. As illustrated in FIG. 9, and similar to FIG. 8, the system 900 may include a plurality of datacenters 1-N each having respective PSAs 910$_1$-910$_N$ (910 generally) and LISP servers 920$_1$-920$_N$. The PSAs 910 may be clustered (i.e., interconnected locally or remotely via WAN 930 links) with the storage hypervisors 940$_1$-940$_N$ providing LISP agents 945$_1$-945$_N$ configured to present VSAs 950$_1$-950$_N$ composed of storage from any of the PSAs 910. The VSAs 950$_1$-950$_N$ provide OSes 970$_1$-970$_N$ and applications 980$_1$-980$_N$, and have respective IP links 960$_1$-960$_N$ as illustrated. Therefore, VSAs 950 may be deployed or treated as a virtual entity on top of a clustering of PSAs 910.

Figure 10:
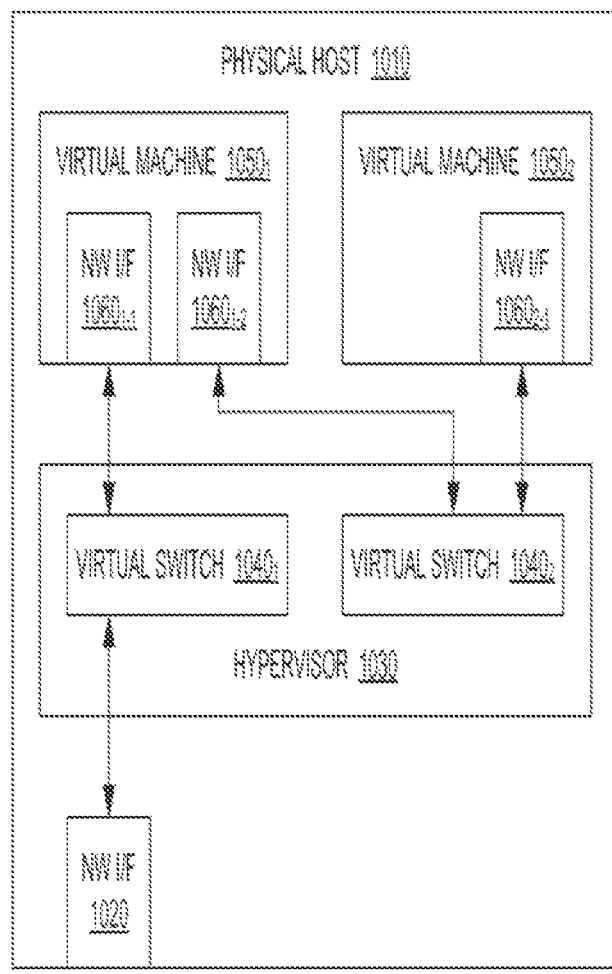
FIG. 10 is a block diagram of a host according to an example embodiment of the present invention.

FIG. 10 is a block diagram of a host 1010 according to an example embodiment of the present invention. As illustrated in FIG. 10, the host 1010 may have a network interface 1020 providing connectivity to a hypervisor 1030 managing a plurality of virtual switches 1040$_1$, 1040$_2$ and a plurality of virtual machines 1050$_1$, 1050$_2$. The first virtual machine 1050$_1$ has a first network interface 1060$_{1-1}$ and a second network interface 1060$_{1-2}$ and the second virtual machine has a first network interface 1060$_{2-1}$. As illustrated in FIG. 10, the first virtual machine first network interface 1060$_{1-1}$ is connected to the first virtual switch 1040$_1$, the first virtual machine second network interface 1060$_{1-2}$ is connected to the second virtual switch 1040$_2$, and the second virtual machine first network interface 1060$_{2-1}$ is connected to the second virtual switch 1040$_2$.

To make application software (e.g., applications hosted on the virtual machines 1050) to be completely transparent to the underneath operating system (i.e., where there application is not aware of whether it is running on an original operating system directly on top of a physical computer server or a guest OS on top of a VM), the IP network stack which is part of OS kernel is carried over completely to guest OS with no consideration for the hypervisor 1030 except for the two virtual switches 1040. Therefore, the IP address association for the host network interface 1020 is carried over to guest OS and application software operating on the VMs 1050. While this works fine for normal scenarios it fails for migration, load balance, and disaster recovery. Traditionally, all applications that have IP addresses embedded (e.g., NFS server) will be disrupted until a new IP address is assigned and the link is been restored with a new IP address.

Figure 12:
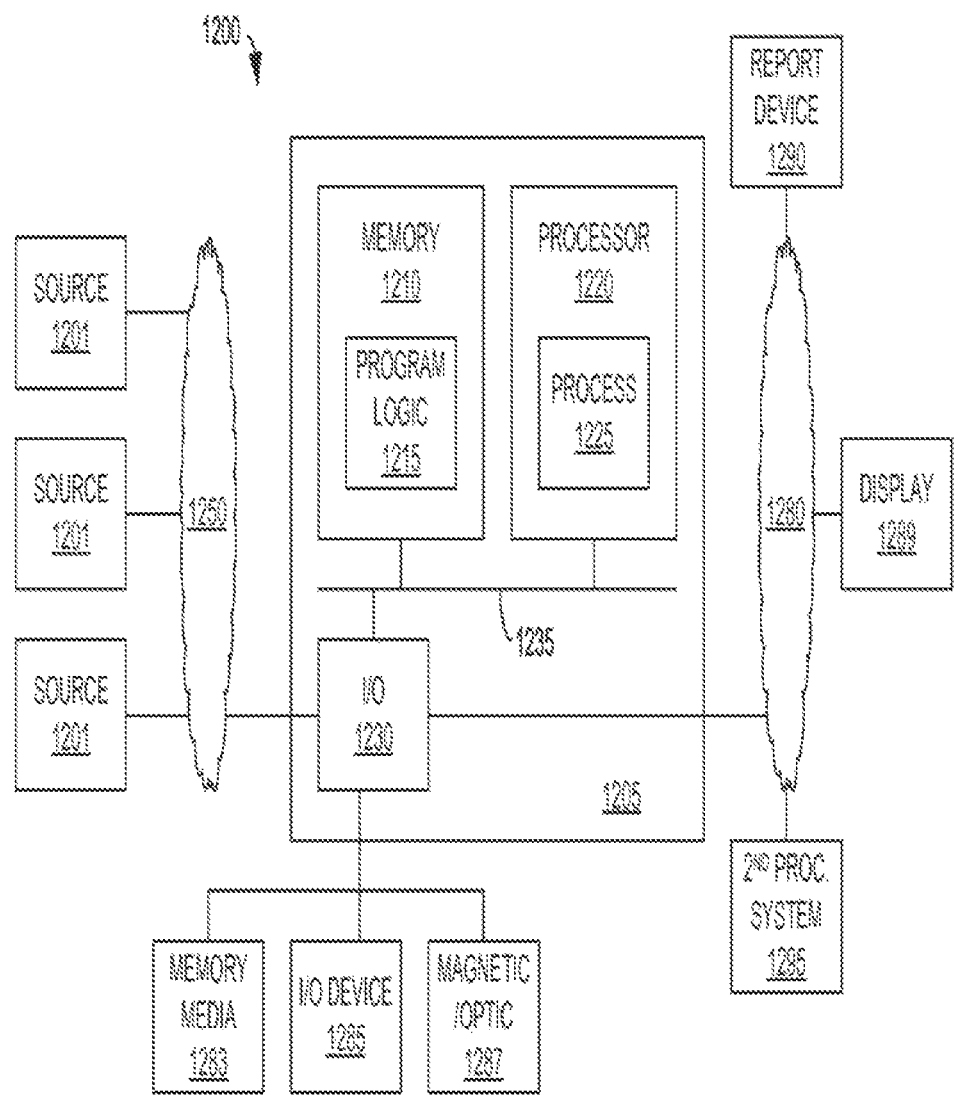
FIG. 12 is a block diagram illustrating an apparatus according to an example embodiment of the present invention.

FIG. 12 is a block diagram of an example embodiment apparatus 1205, such as a general purpose computer, according to an example embodiment of the present invention. The apparatus 1205 may be part of a system 1200 and includes memory 1210 storing program logic 1215, a processor 1220 for executing a process 1225, and a communications I/O interface/controller 1230, connected via a bus 1235. Some embodiments may comprise multiple processors or a processor with multiple cores. Processor 1220 and memory 1210 may together execute a computer process, such as the processes described herein.

System I/O controller 1230 may be in communication with display 1289, I/O device 1285, non-transitory computer readable storage medium 1283, 1287, and/or sources 1201 via network 1250. As shown in FIG. 12, the system I/O controller 1230 may be in communication with display 1289 via network 1280. The system I/O controller 1230 may also be in communication with a report device 1290 and a second processing system 1295 via network 1280. Display 1289 may be any computer display, such as a monitor, a smart phone screen, or wearable electronics and/or it may be an input device such as a touch screen. Input/output device 1285 may be a keyboard, mouse, track-pad, camera, microphone, or the like, and storage medium 1283, 1287 may comprise a hard drive, flash drive, solid state drive, magnetic tape, magnetic disk, optical disk, or any other computer readable and/or writable medium. Storage device 1283, 1287 may also reside inside general purpose computer 1205, rather than outside as shown in FIG. 12.

The network 1250 may be any computer network, such as a local area network (LAN), wide area network (WAN) such as the internet, a corporate intranet, a metropolitan area network (MAN), a storage area network (SAN), a cellular network, a personal area network (PAN), or any combination thereof. Further, the network 1250 may be either wired or wireless or any combination thereof, and may provide input to or receive output from I/O controller 1230. In an embodiment, the network 1250 may be in communication with one or more network connected devices 1201, such as another general purpose computer, smart phone, PDA, storage device, tablet computer, or any other device capable of connecting to a network.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 12, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 13:
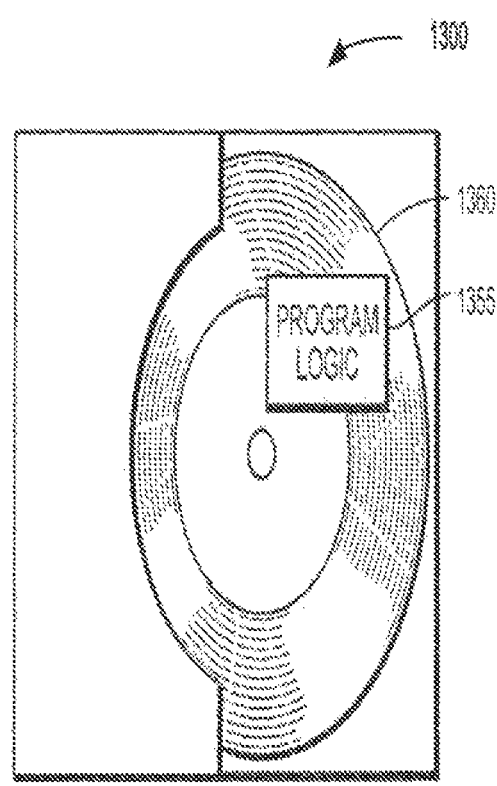
FIG. 13 is a block diagram of a an example embodiment of the present invention embodied in computer program code.

FIG. 13 is a block diagram of a computer program product 1300 including program logic 1355, encoded on a computer-readable medium 1360 in computer-executable code configured for carrying out the methods of the invention, according to an example embodiment of the present invention. The logic for carrying out the method may be embodied as part of the aforementioned system, which is useful for carrying out a method described with reference to embodiments shown.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

It should be understood that the particular sets of modules and other components implemented in the systems as described above are presented by way of example only. In other embodiments, only subsets of these components, or additional or alternative sets of components, may be used, and such components may exhibit alternative functionality and configurations.

Also, the particular processing operations and other system functionality described above are presented by way of illustrative example only, and should not be construed as limiting the scope of the invention in any way. Alternative embodiments can use other types of processing operations involving one or more data centers or other information processing system components. For example, the ordering of the process steps may be varied in other embodiments, or certain steps may be performed concurrently with one another rather than serially. In addition, at least a subset of the process steps may be repeated periodically for different storage migrations or other system reconfigurations.

It is to be appreciated that functionality may be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Communications between the various elements of an information processing system as disclosed herein may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

Example embodiments of the present invention are illustratively implemented using one or more processing platforms, examples of which have been described in greater detail. A given such processing platform comprises at least one processing device comprising a processor coupled to a memory, and the processing device may be implemented at least in part utilizing one or more virtual machines.

Portions of an information processing system as disclosed herein may illustratively comprise cloud infrastructure. The cloud infrastructure may comprises virtual machines implemented using a hypervisor running on physical infrastructure. The cloud infrastructure further comprises sets of applications running on respective ones of the virtual machines under the control of the hypervisor. Example embodiments of the present invention may include one or more hypervisors each providing a set of virtual machines using at least one underlying physical machine. Different sets of virtual machines provided by one or more hypervisors may be utilized in configuring different portions of a given data center. An example of a commercially available hypervisor platform that may be used in example embodiments of the present invention is the VMware® vSphere® server virtualization platform which may have an associated virtual infrastructure management system such as VMware® vCenter™ virtual infrastructure management software.

One or more of the processing modules or other components of an information processing system as disclosed herein may therefore each run on a computer, server, storage device, or other processing platform element. A given such element may be viewed as an example of what is more generally referred to herein as a "processing device." The cloud infrastructure described above may represent at least a portion of one processing platform. Another example of such a processing platform is a plurality of processing devices which communicate with one another over a network.

Each processing device of the processing platform may comprise a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Also included in the processing device is network interface circuitry, which is used to interface the processing device with the network and other system components, and may comprise conventional transceivers.

The particular processing platforms described above are presented by way of example only, and a given information processing system may include additional or alternative processing platforms, as well as numerous distinct processing platforms in any combination, with each such platform comprising one or more computers, servers, storage devices or other processing devices. It should therefore be understood that in other embodiments different arrangements of additional or alternative elements may be used. At least a subset of these elements may be collectively implemented on a common processing platform, or each such element may be implemented on a separate processing platform. Also, numerous other arrangements of computers, servers, storage devices or other components are possible in an information processing system as disclosed herein. Such components can communicate with other elements of the information processing system over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems, data centers, file systems, compute infrastructure and storage infrastructure that can benefit from the enhanced flexibility provided in storage mobility and other types of storage reconfiguration. Also, the particular configurations of system and device elements described above may be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the sake of clarity, the processes and methods herein have been illustrated with a specific flow, but it should be understood that other sequences may be possible and that some may be performed in parallel, without departing from the spirit of the invention. Additionally, steps may be subdivided or combined. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A computer-implemented method for isolating a tenant in a cloud system environment comprising:
    associating an endpoint identifier and a tenant identifier to a virtual storage array in a datacenter;
    associating a routing locator with the endpoint identifier and the tenant identifier in accordance with a locater-identifier separation protocol;
    directing communication with the virtual storage array according to the endpoint identifier and the tenant identifier via their association with the routing locator;
    wherein the virtual storage array is managed by a first storage hypervisor associated with one or more physical storage arrays in a first datacenter;
    wherein the first storage hypervisor implements a first locator-identifier separation protocol agent;
    responsive to determining that the virtual storage array is to be migrated from being hosted on the one or more physical storage arrays associated with the first storage hypervisor in the first datacenter to being hosted on one or more other physical storage arrays associated with a second storage hypervisor in a second datacenter, the first locator-identifier separation protocol agent providing a notification to a first locator-identifier separation protocol server running in the first datacenter to indicate that an existing link between the first storage hypervisor and one or more applications hosted on the virtual storage array is no longer available; and
    wherein a second locator-identifier separation protocol agent implemented on the second storage hypervisor sends a notification to a second locator-identifier separation protocol server running in the second datacenter to establish a new link between the second storage hypervisor and the one or more applications hosted on the virtual storage array responsive to the virtual storage array being migrated to being hosted on the one or more other physical storage arrays associated with the second storage hypervisor.

2. The method of claim 1 further comprising, in conjunction with a reconfiguration of the virtual storage array, updating the association between the routing locator and the endpoint identifier to a new routing locator consistent with the reconfiguration of the virtual storage array.

3. The method of claim 2 wherein associating an endpoint identifier to a virtual storage array in a datacenter comprises receiving a first subscription request specifying the endpoint identifier of the virtual storage array and a current subnet of the virtual storage array.

4. The method of claim 3 wherein receiving a first subscription request specifying the endpoint identifier of the virtual storage array and a current subnet of the virtual storage array comprises receiving the first subscription request from the first locator-identifier separation protocol agent operating in the first storage hypervisor managing the virtual storage array.

5. The method of claim 3 wherein associating a routing locator with the endpoint identifier comprises associating the endpoint identifier of the virtual storage array with the routing locator specifying the current subnet of the virtual storage array.

6. The method of claim 5 wherein directing communications with the virtual storage array according to the endpoint identifier via its association with the routing locator comprises directing communications with the virtual storage array according to the endpoint identifier encapsulated in a header of a packet traversing a network according to the routing locator.

7. The method of claim 5 further comprising:
    receiving a second subscription request specifying the endpoint identifier of the virtual storage array and an updated subnet of the virtual storage array; and updating the endpoint identifier of the virtual storage array to specify the updated subnet of the virtual storage array.

8. The method of claim 6 further comprising:
responsive to the reconfiguration and before receiving the second subscription request, locking the virtual storage array to prevent writes by any associated storage clients; and
unlocking the virtual storage array to allow writes by any associated storage clients after updating the endpoint identifier of the virtual storage array.

9. The method of claim 6 further comprising maintaining a mapping database having a plurality of entries each comprising an endpoint identifier in association with a routing locator.

10. The method of claim 6 wherein:
the locator-identifier separation protocol comprises Locator/ID Separation Protocol (LISP);
the endpoint identifiers comprise LISP EIDs; and
the routing locators comprise LISP RLOCs.

11. A system comprising:
a virtual storage array in a datacenter; and
at least one processing device communicatively coupled to the virtual storage array implementing a locator-identifier separation protocol and configured:
to associate a routing locator with an endpoint identifier and a tenant identifier in accordance with the locator-identifier separation protocol; and
to direct communications with the virtual storage array according to the endpoint identifier and the tenant identifier via their association with the routing locator;
wherein the virtual storage array is managed by a first storage hypervisor associated with one or more physical storage arrays in a first datacenter;
wherein the first storage hypervisor implements a first locator-identifier separation protocol agent;
responsive to determining that the virtual storage array is to be migrated from being hosted on the one or more physical storage arrays associated with the first storage hypervisor in the first datacenter to being hosted on one or more other physical storage arrays associated with a second storage hypervisor in a second datacenter, the first locator-identifier separation protocol agent providing a notification to a first locator-identifier separation protocol server running in the first datacenter to indicate that an existing link between the first storage hypervisor and one or more applications hosted on the virtual storage array is no longer available; and
wherein a second locator-identifier separation protocol agent implemented on the second storage hypervisor sends a notification to a second locator-identifier separation protocol server running in the second datacenter to establish a new link between the second storage hypervisor and the one or more applications hosted on the virtual storage array responsive to the virtual storage array being migrated to being hosted on the one or more other physical storage arrays associated with the second storage hypervisor.

12. The system of claim 11 wherein the at least one processing device is further configured to, in conjunction with a reconfiguration of the virtual storage array, update the association between the routing locator and the endpoint identifier to a new routing locator consistent with the reconfiguration of the virtual storage array.

13. The system of claim 12 wherein the at least one processing device is further configured to receive a first subscription request specifying the endpoint identifier of the virtual storage array and a current subnet of the virtual storage array.

14. The system of claim 13 wherein the at least one processing device is further configured to receive the first subscription request from a locator-identifier separation protocol agent operating in the first storage hypervisor managing the virtual storage array.

15. The system of claim 13 wherein the at least one processing device is further configured to associate the endpoint identifier of the virtual storage array with the routing locator specifying the current subnet of the virtual storage array.

16. The system of claim 15 wherein the at least one processing device is further configured to direct communications with the virtual storage array according to the endpoint identifier encapsulated in a header of a packet traversing a network according to the routing locator.

17. The system of claim 15 wherein the at least one processing device is further configured to receive a second subscription request specifying the endpoint identifier of the virtual storage array and an updated subnet of the virtual storage array and update the endpoint identifier of the virtual storage array to specify the updated subnet of the virtual storage array.

18. The system of claim 16 wherein the at least one processing device is further configured to, responsive to the reconfiguration and before receiving the second subscription request, lock the virtual storage array to prevent writes by any associated storage clients and unlock the virtual storage array to allow writes by any associated storage clients after updating the endpoint identifier of the virtual storage array.

19. The system of claim 16 wherein the at least one processing device is further configured to maintain a mapping database having a plurality of entries each comprising an endpoint identifier in association with a routing locator.

20. The system of claim 16 wherein:
the locator-identifier separation protocol comprises Locator/ID Separation Protocol (LISP);
the endpoint identifiers comprise LISP EIDs; and
the routing locators comprise LISP RLOCs.

21. A computer program product including a non-transitory computer readable storage medium having computer program code encoded thereon that when executed by a processor of a computer causes the computer to implement a locator-identifier separation protocol, the computer program product comprising:
computer program code for associating an endpoint identifier and a tenant identifier to a virtual storage array in a datacenter;
computer program code for associating a routing locator with the endpoint identifier and the tenant identifier in accordance with a locator-identifier separation protocol; and
computer program code for directing communications with the virtual storage array according to the endpoint identifier and the tenant identifier via their association with the routing locator;
wherein the virtual storage array is managed by a first storage hypervisor associated with one or more physical storage arrays in a first datacenter;
wherein the first storage hypervisor implements a first locator-identifier separation protocol agent;
responsive to determining that the virtual storage array is to be migrated from being hosted on the one or more physical storage arrays associated with the first storage hypervisor in the first datacenter to being hosted on one or more other physical storage arrays associated with a second storage hypervisor in a second datacenter, the first locator-identifier separation protocol agent providing a notification to a first locator-identifier separation protocol server running in the first datacenter to indicate that an existing link between the first storage hypervisor and one or more applications hosted on the virtual storage array is no longer available; and wherein a second locator-identifier separation protocol agent implemented on the second storage hypervisor sends a notification to a second locator-identifier separation protocol server running in the second datacenter to establish a new link between the second storage hypervisor and the one or more applications hosted on the virtual storage array responsive to the virtual storage array being migrated to being hosted on the one or more other physical storage arrays associated with the second storage hypervisor.

* * * * *